INVENTOR
RAMON P. BRITT

BY R. Hoffman

ATTORNEY

INVENTOR
RAMON P. BRITT

BY R. Hoffman

ATTORNEY

INVENTOR
RAMON P. BRITT

BY R. Hoffman
ATTORNEY

1

3,479,729

METHOD OF ATTACHING LEADS TO A CYLINDRICAL PIEZOELECTRIC TRANSDUCER

Ramon P. Britt, Baltimore, Md., assignor to the United States of America as represented by the Secretary of Agriculture Filed Sept. 26, 1967, Ser. No. 670,812
Int. Cl. B23k *31/02*
U.S. Cl. 29—471.3 3 Claims

ABSTRACT OF THE DISCLOSURE

A method of attaching two or more leads to a cylindrical piezoelectric transducer whereby the leads to be attached are used as a means of rigidly suspending a piezoelectric ceramic cylinder in such a manner that the leads are positioned at the desired points of attachment to the internal electrode.

Solder is transferred by a soldering iron or other heating means to the electrode-lead interface by inserting the heating means into the hollow cylinder, thus attaching all the leads simultaneously.

A non-exclusive, irrevocable, royalty-free license in the invention herein described, throughout the world for all purposes of the United States Government, with the power to grant sublicenses for such purposes, is hereby granted to the Government of the United States of America.

The present invention relates to a unique method of attaching leads to an electrode and more particularly to attaching leads to the internal electrode of a cylindrical piezoelectric transducer.

For optimum utility, a transducer operated within a two-phase hydrodynamic flow to transduce pressure shock waves therein must be small enough to minimize restriction of the hydrodynamic flow, and in many cases must be attached to the end of a probe, preferably a very small diameter stainless steel or similar tube, so that it can be operated at any desired position within the system. Also, since the transducer must operate reliably in a hostile environment for long periods of time it must be rugged in addition to being sensitive.

One configuration of a piezoelectric transducer is in hollow cylindrical form, with silver electrodes fired on inner and outer surfaces and is the form with which this invention is concerned. This type of ceramic cylinder is usually polarized by the manufacture with direct current voltage while the ceramic cylinder cools from its Curie temperature to ambient temperature.

The method of attaching leads to the inner surface of a miniature ceramic piezoelectric cylinder such as that used in this invention greatly influences the degree of restriction of the radial mode of vibration of the cylinder and its internal electrode and consequently greatly influences the sensitivity and the utility of the transducer assembly. In order to minimize restriction of the movement of the internal electrode, the leads must be attached with a minimum amount of solder. Also, for reliability when a transducer is operated on a probe in a hostile environment, the piezoelectric cylinder should be supported so that stress parallel to the probe axis is uniformly distributed among the transducer supporting members. Therefore, when the leads are the supporting members as they are in the present invention, they should be uniformly distributed.

One object of this invention is to suspend a piezoelectric ceramic cylinder by using the leads that are to be attached to its internal electrode as the suspending means and accomplishing said suspension in such a manner that

2 the assembly is held almost rigidly by said suspending means.

Another object of the invention is to attach simultaneously two or more leads to the internal electrode of the piezoelectric ceramic cylinder.

Another object of the invention is to attach the leads in a manner that does not depolarize the ceramic cylinder.

Another object of the invention is to attach the leads to the internal electrode in a manner that minimizes restriction of the movement of the internal electrode including the use of a minimum amount of solder.

Another object of the invention is to attach the leads in such a manner that the fixed silver electrode does not separate from the surface of the ceramic cylinder.

A still further object of the invention is to attach the leads to fixed supports with solder having a higher melting point than the solder used to attach the leads to the internal electrode.

In accordance with the present invention, a piezoelectric ceramic hollow cylinder is suspended by leads that are attached to fixed supports, and while it is held in this almost rigid position, solder is applied to the tip of a soldering iron or other suitable heating means, said heating means is inserted immediately into the cylinder transferring the solder to the electrode-lead interfaces, thereby attaching all the leads simultaneously to the internal electrode of the piezoelectric ceramic cylinder. Suspension of the cylinder in an almost rigid position is an important feature of this invention and is accomplished by attaching leads to the base of two or more fixed posts, directing the free ends of said leads to traverse through the interior of the hollow cylinder, taking up slack in said leads and attaching the free ends of said taut leads to the top of the fixed posts so that both ends of each lead are attached to the same post, each lead forming a U-shaped configuration with the bottom of the U held tightly against the internal electrode of the piezoelectric cylinder.

As matter of convenience in applying this invention, the posts of a transistor header were used because headers were readily available. Silver-coated copper wire is preferred for use as the lead material, although other low-resistance wire material can be used. Silver solder with a low temperature molten state is the preferred soldering material for application to the lead-electrode interface.

Lead-tin solder which has a higher melting point than silver solder is preferred for attaching leads to the fixed posts so that cylinder suspension is maintained during attachment of the leads to the internal electrode.

The invention will be described with reference to the accompanying drawing in which.

Figure 1:
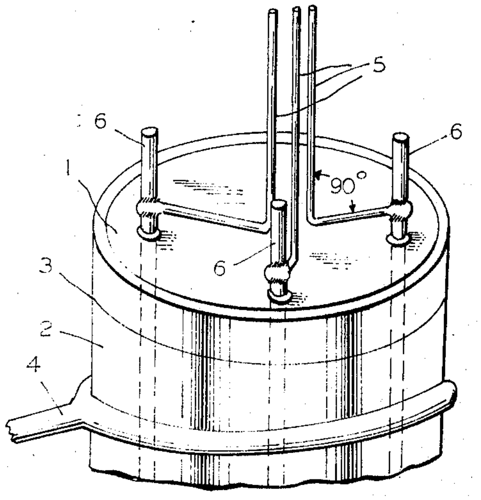
FIG. 1 shows the leads attached to the base of the fixed posts.

FIG. 1 shows an example of a transistor header 1 used as a mounting jig. The transistor header 1 is connected to tubing 2, which in this case is ⅜ inch O.D. copper, by solder at about the position indicated by line 3 and the whole assembly is supported in a rigid position by attaching it to any rigid support with a castalloy or other type clamp 4. One end of each lead 5 is attached by solder to the base of each fixed post 6.

Figure 2:
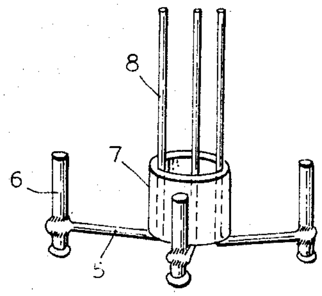
FIG. 2 shows each lead traversing through the hollow piezoelectric ceramic cylinder.

As shown in FIG. 2, the free end 8 of each lead 5 traverses through the hollow piezoelectric ceramic cylinder 7. The free ends 8 of the leads 5 are then drawn tightly and soldered to the top of the fixed posts 6 as shown in FIG. 3, thus suspending the cylinder 7 in an almost rigid position.

Figure 3:
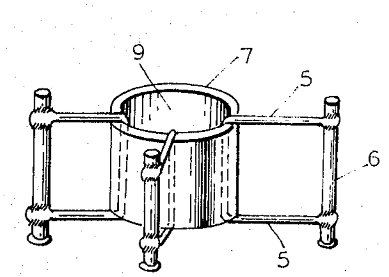
FIG. 3 shows the cylinder suspended by the leads after the free ends were drawn tightly and attached to the top of the posts. This figure also shows the U-shaped configuration of each lead wire with the bottom of the U held tightly against the internal electrode of the cylinder.
Figure 4:
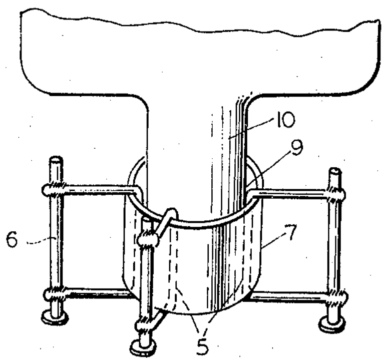
FIG. 4 shows tip of soldering iron after it has been thrust into the cylinder to simultaneously attach all leads

The suspension of the piezoelectric ceramic hollow cylinder 7 in this almost rigid position is an important feature of this invention because each lead 5 is tightly held against the internal electrode 9 as shown in FIG. 3, after being automatically positioned for attachment to the internal electrode 9 by virtue of the preselected position of the fixed post to which it is joined. In addition, the operator of the soldering iron or other heating means does not need to further support the cylinder 7 or the lead wires 5 and has both hands free to apply the necessary heat and solder to simultaneously attach all the leads 5 to the internal electrode 9. As shown in FIG. 4, the tip of a soldering iron or other heating means 10 having a diameter equal to the inside diameter of the hollow piezoelectric ceramic cylinder 7 minus twice the diameter of the lead wire minus a reasonable tolerance to permit entry of tip and having means for controlling the temperature of the tip is used as a source of heat to attach the leads 5 to the internal electrode 9 of the cylinder 7. After a minimal amount of soldering flux is applied to the electrode-lead interfaces, solder, preferably silver solder, is fed to the tip of the soldering iron or other heating means 10 at a point about ¼″ above the cylinder assembly. The tip of the soldering iron or other heating means 10 with the solder on it is then thrust immediately and directly into the assembly as shown in FIG. 4, thus attaching simultaneously all the leads 5 to the internal electrode 9. The assembly is then ultrasonically cleaned in solvent to remove solder flux residue.

Figure 5:
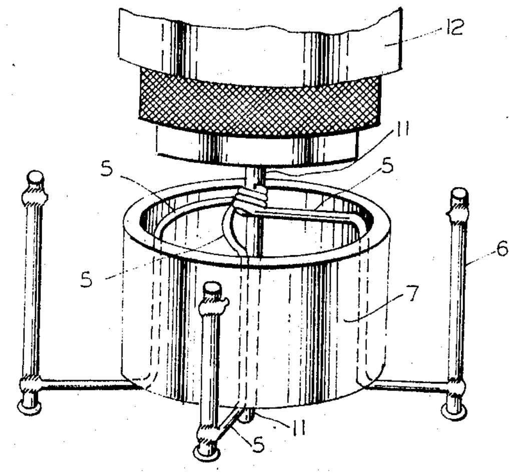
FIG. 5 shows assembly after the center conductor of a coaxial cable has been directed through the cylinder and after the leads have been detached from the top of the posts and soldered to the center conductor.
Figures 6, 7:
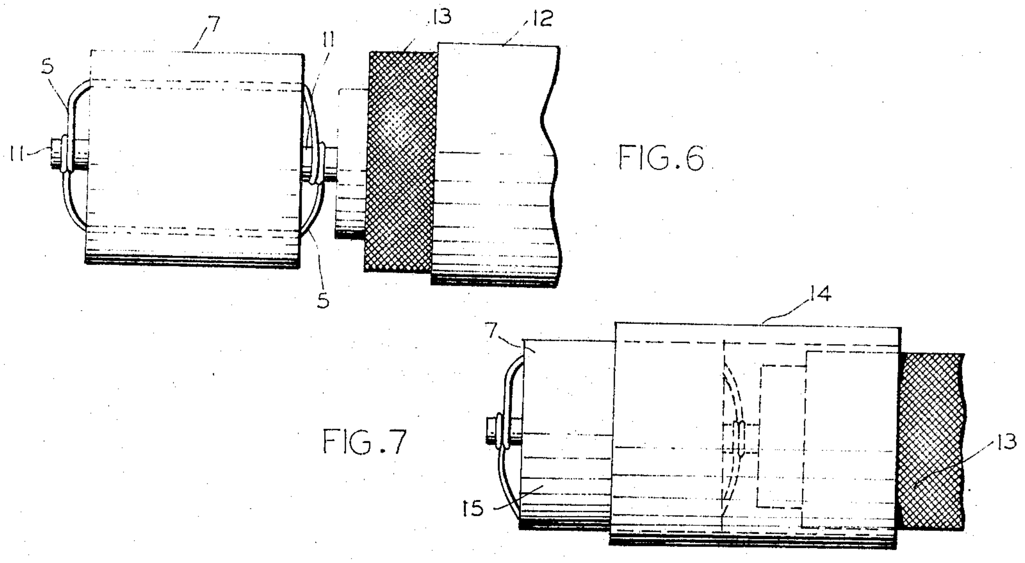
FIG. 6 illustrates how the ceramic cylinder is supported after both ends of the leads are soldered to the center conductor.
FIG. 7 shows the position of the thin-walled metal tube in relation to the cable braid and the ceramic cylinder.
Figure 8:
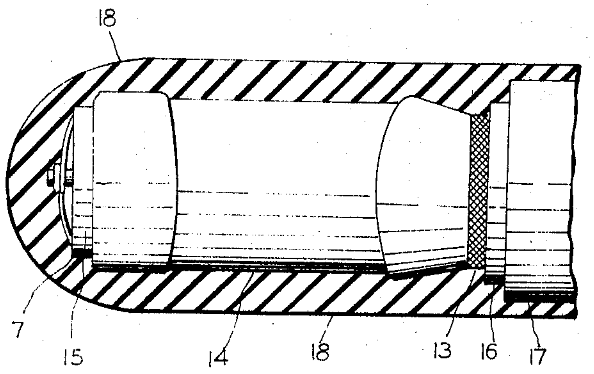
FIG. 8 shows the completed assembly encapsulated in silicone.

In order to complete assembly of the transducer, the leads 5 are detached from the top of posts 6 by cutting with a sharp blade. As shown in FIG. 5 the center conductor 11 of a coaxial cable 12 is directed into the top of and through the ceramic tube 7 until it protrudes beyond the lower end of said tube 7 and then the leads 5 which were detached from the top of posts 6 are wrapped around and soldered to the center conductor 11. The leads 5 attached at the base of the posts 6 are detached, wrapped around and soldered to the protruding end of the center conductor 11 as shown in FIG. 6. The piezoelectric ceramic cylinder 7 is now rigidly supported by the lead connections to the center conductor 11 of the coaxial cable 12. The loose ends of the cable braid 13 are covered with solder and then filed so that the outside diameter of the soldered braid 13 does not exceed the outside diameter of ceramic cylinder 7. A short length of thin-walled metal tubing 14 having a diameter only slightly larger than that of the piezoelectric ceramic cylinder 7 is slipped over the ceramic cylinder 7 and the solder-covered cable braid 13 and positioned as shown in FIG. 7, so that about one-half of the length of the ceramic cylinder 7 is exposed beyond one end of the thin-walled metal tube 14 and some of the cable braid 13 is exposed beyond the other end. After application of a minimal amount of soldering flux, one end of the thin-walled metal tube 14 is soldered to the solder-covered cable braid 13 and the other end to the external electrode 15 of the piezoelectric ceramic cylinder 7 (FIG. 8). After it is ultrasonically cleaned in solvent, the assembly including the exposed part of the cable jacket 16 and a short portion of the supporting sheath 17 is encapsulated with high-temperature silicone rubber 18 (FIG. 8) and is ready for use.

Figure 9:
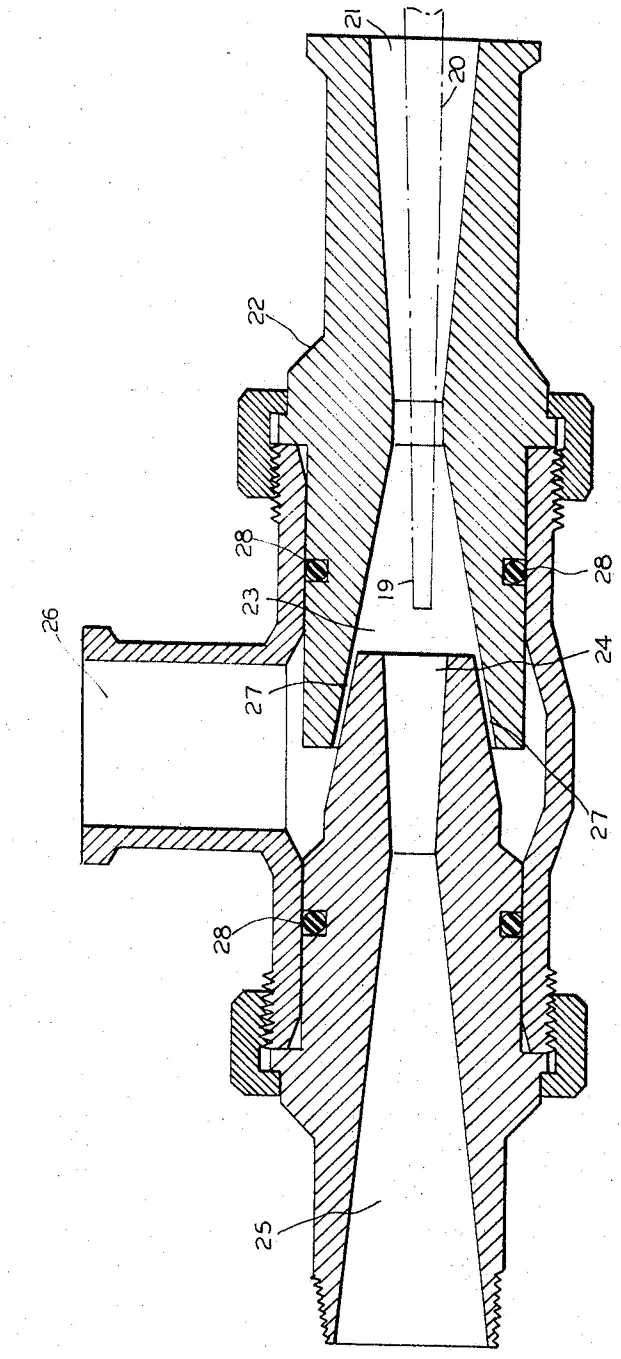
FIG. 9 shows a typical application of the transducer.

A typical application of the transducer operating on a probe in a hostile environment is shown in FIGURE 9. The transducer 19 attached to the end of probe 20 is inserted through the product outlet 21 of the steam injector 22 so that the transducer 19 is located in the mixing chamber 23 at a point approximate to the nozzle 24 of the steam inlet 25. The product which is usually a liquid such as milk enters through the product inlet 26, is forced through a constricted passageway 27 into the mixing chamber 23 where it mixes with the steam before being expelled thru the product outlet 21. The O-rings 28 are high pressure moisture sealants and prevent leakage of liquid from within the system. This type of steam injector is more fully described by Roberts and Dill, J. Dairy Science, 45, 937–940, 1962, and by Peterson and Jordan, J. Dairy Science, 47, 365–369, 1964.

In the construction of the transducer 19 for which the present invention was devised, the ceramic of the piezoelectric cylinder 7 was a lead zirconate titanate type having a Curie temperature of about 365° C. The cylinder 7 was about 1/16″ in length and about 1/16″ in outside diameter. It had a wall thickness of 0.010″ and had silver electrodes fired on inner and outer surfaces. The leads 5 were silver coated copper wire having an outside diameter of about 0.003″ to 0.005″ and silver solder was used to attach the leads to the internal electrode and the center conductor of the coaxial cable. Trichloroethylene was used in the ultrasonic cleaning process. Although these were the materials preferred in this application, the method is not limited to them since other materials and solvents are also applicable.

I claim:

1. A method for attaching leads to the internal electrode of a cylindrical piezoelectric transducer comprising attaching leads to the base of two or more fixed posts, directing the free ends of said leads to transverse the interior of the hollow piezoelectric cylinder, taking up slack in said leads and attaching the free ends of said taut leads to the top of the aforesaid fixed posts in such manner that both ends of each lead are attached to the same post, each said lead forming a U-shaped configuration with the bottom of the U held tightly against the internal electrode of the piezoelectric cylinder, thereby automatically positioning said leads at the desired point of attachment to the internal electrode, transferring solder from a soldering iron or other heating means to the electrode-lead interfaces by inserting said heating means into the hollow cylinder, said heating means having a diameter equal to the internal diameter of the piezoelectric cylinder minus twice the lead diameter minus a tolerance to permit entry of heating means, thus effecting a simultaneous attachment of all the leads to the internal electrode.

2. The method of claim 1 in which the leads are silver-coated copper wire.

3. The method of claim 1 in which the lead of electrode attaching agent is low temperature silver solder.

References Cited

UNITED STATES PATENTS

| | | | |
|---|---|---|---|
| 3,068,446 | 12/1962 | Ehrlich et al. | 310—9.8 XR |
| 3,294,951 | 12/1966 | Olson | 29—471.1 |
| 3,309,929 | 3/1967 | Simmons et al. | 310—9.8 XR |

JOHN F. CAMPBELL, Primary Examiner

R. B. LAZARUS, Assistant Examiner

U.S. Cl. X.R.

29—25.35, 471.1; 310—9.8